(12) United States Patent
Rondinelli

(10) Patent No.: US 7,399,095 B2
(45) Date of Patent: Jul. 15, 2008

(54) APPARATUS FOR MOUNTING A PANORAMIC MIRROR

(75) Inventor: Michael Rondinelli, Bethel Park, PA (US)

(73) Assignee: EyeSee360, Inc., Pittsburgh, PA (US)

( * ) Notice: Subject to any disclaimer, the term of this patent is extended or adjusted under 35 U.S.C. 154(b) by 204 days.

(21) Appl. No.: 10/887,615

(22) Filed: Jul. 9, 2004

(65) Prior Publication Data

US 2005/0013022 A1    Jan. 20, 2005

Related U.S. Application Data

(60) Provisional application No. 60/485,821, filed on Jul. 9, 2003.

(51) Int. Cl.
   G02B 5/10    (2006.01)
   G02B 7/182   (2006.01)
   G03B 37/00   (2006.01)

(52) U.S. Cl. ........................ 359/868; 359/871; 359/725; 396/21; 348/36

(58) Field of Classification Search .................. 359/867, 359/868, 869, 871, 872, 725; 396/21; 348/36
   See application file for complete search history.

(56) References Cited

U.S. PATENT DOCUMENTS

| | | | |
|---|---|---|---|
| 4,431,289 A | | 2/1984 | Reinhardt |
| 4,922,275 A | | 5/1990 | Hughes |
| H783 H | * | 6/1990 | Callender ................... 359/366 |
| 5,040,759 A | | 8/1991 | Wainwright |
| 5,086,311 A | | 2/1992 | Naka et al. |
| 5,181,145 A | * | 1/1993 | Eden ........................... 359/859 |
| 5,238,210 A | * | 8/1993 | Heitzmann ............... 244/172.8 |
| 5,259,584 A | | 11/1993 | Wainwright |
| 5,363,160 A | | 11/1994 | Fox et al. |
| 5,400,169 A | * | 3/1995 | Eden ........................... 359/208 |
| 5,760,979 A | * | 6/1998 | Saito ........................... 359/859 |
| 6,028,719 A | * | 2/2000 | Beckstead et al. ........... 359/725 |
| 6,404,547 B1 | * | 6/2002 | Hull ............................ 359/399 |
| 6,424,377 B1 | * | 7/2002 | Driscoll et al. .............. 348/335 |
| 6,493,032 B1 | * | 12/2002 | Wallerstein et al. ......... 348/335 |
| 6,594,448 B2 | * | 7/2003 | Herman et al. ................ 396/21 |
| 6,738,569 B1 | * | 5/2004 | Sogabe et al. ................. 396/21 |
| 6,856,472 B2 | * | 2/2005 | Herman et al. .............. 359/725 |
| 6,865,029 B2 | * | 3/2005 | Kuriyama et al. ........... 359/726 |

(Continued)

FOREIGN PATENT DOCUMENTS

FR    1234341    * 10/1960

(Continued)

*Primary Examiner*—Ricky D Shafer
(74) *Attorney, Agent, or Firm*—Matthew W. Gordon, Esq.; Alan G. Towner, Esq.; Pietragallo Gordon Alfano Bosick & Raspanti, LLP

(57) ABSTRACT

The present invention is directed to a mounting apparatus for mounting a panoramic mirror in front of the focal point of a camera. The mounting apparatus comprises a conical optical stage configured to contact the mirror at an end point along the longitudinal axis. An optical masking spike is also disclosed which can be disposed along the longitudinal axis and extend at least partially into the interior of the conical optical stage. The conical optical stage and optical masking spike provide improved stability of the overall optic and reduce unwanted glare in images reflected to the camera.

13 Claims, 11 Drawing Sheets

U.S. PATENT DOCUMENTS

| | | |
|---|---|---|
| 2002/0075295 A1 | 6/2002 | Stentz et al. |
| 2003/0039395 A1 | 2/2003 | Rondinelli et al. |
| 2003/0068098 A1 | 4/2003 | Rondinelli et al. |
| 2003/0095131 A1 | 5/2003 | Rondinelli |
| 2003/0095338 A1 | 5/2003 | Singh et al. |

FOREIGN PATENT DOCUMENTS

| | | | |
|---|---|---|---|
| WO | WO 01/40863 | * | 6/2001 |
| WO | WO 03/046632 | * | 6/2003 |

* cited by examiner

APPARATUS FOR MOUNTING A PANORAMIC MIRROR

CROSS REFERENCE TO RELATED APPLICATIONS

This application claims the benefit of U.S. Provisional Application No. 60/485,821 filed Jul. 9, 2003.

FIELD OF THE INVENTION

The present invention relates to an apparatus for mounting a panoramic mirror, and more particularly relates to an apparatus for attaching a mirrored panoramic optic in front of a camera lens that improves structural rigidity, increases the area of imaged surface of the mirror, and reduces glare.

BACKGROUND INFORMATION

Recent work has shown the benefits of panoramic imaging, which is able to capture a large azimuth view with a significant elevation angle. Specifically, shaped radial-symmetric equirectangular mirrors are used to produce a panoramic image with a wide field of view, both vertically and horizontally. The mirror is placed a certain distance in front of the lens of the camera to achieve a desired effect. As is shown in FIG. 1, the traditional mounting apparatus includes a flat optical stage, typically comprised of glass or transparent plastic, and a center post perpendicularly attached to the flat optical stage that supports the mirror.

The traditional design poses several problems. Structurally, the mass of the mirror is supported almost entirely by the center post, which is attached at a perpendicular angle to the flat optical stage. Centering the mass of the mirror at the top of the center post gives a mechanical advantage to lateral forces applied to the mirror, i.e., resting the optic on its side or impacting the side of the mirror. These forces are subsequently transferred to the flat optical stage, which can cause distortion or breakage of the mirror, and often necessitate an increased thickness of the material used to produce the flat optical stage. This results in reduced image quality and a more fragile camera assembly. Additionally, as the flat optical stage is moved closer to the lens of the camera, the width of the center post obstructs the camera's view of the center of the mirror. This requires the panoramic optic to be larger and taller to accommodate an adequate field of view.

DETAILED DESCRIPTION OF THE INVENTION

Figure 1:
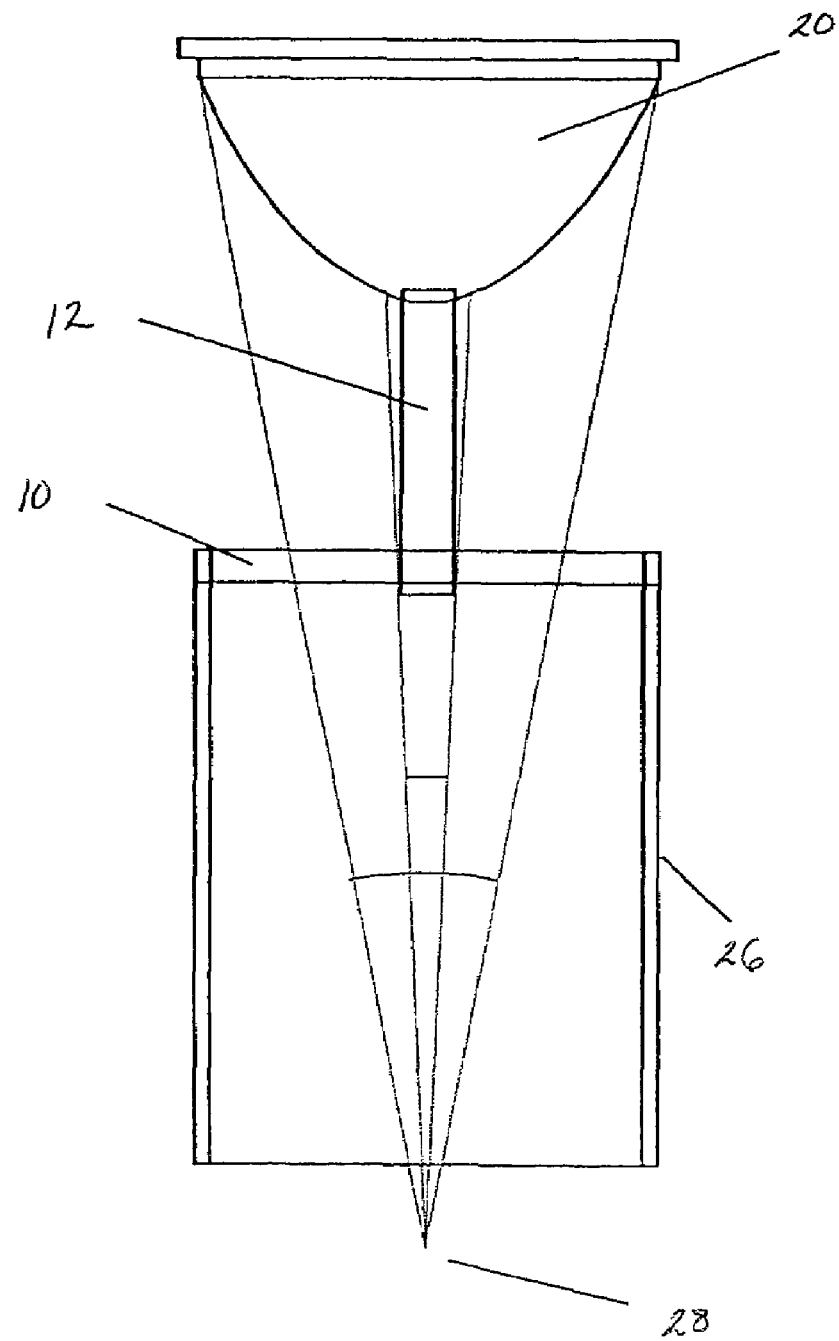
FIG. 1 is a cross sectional view of a traditional mounting apparatus having a flat optical stage and a center post.
Figure 2:
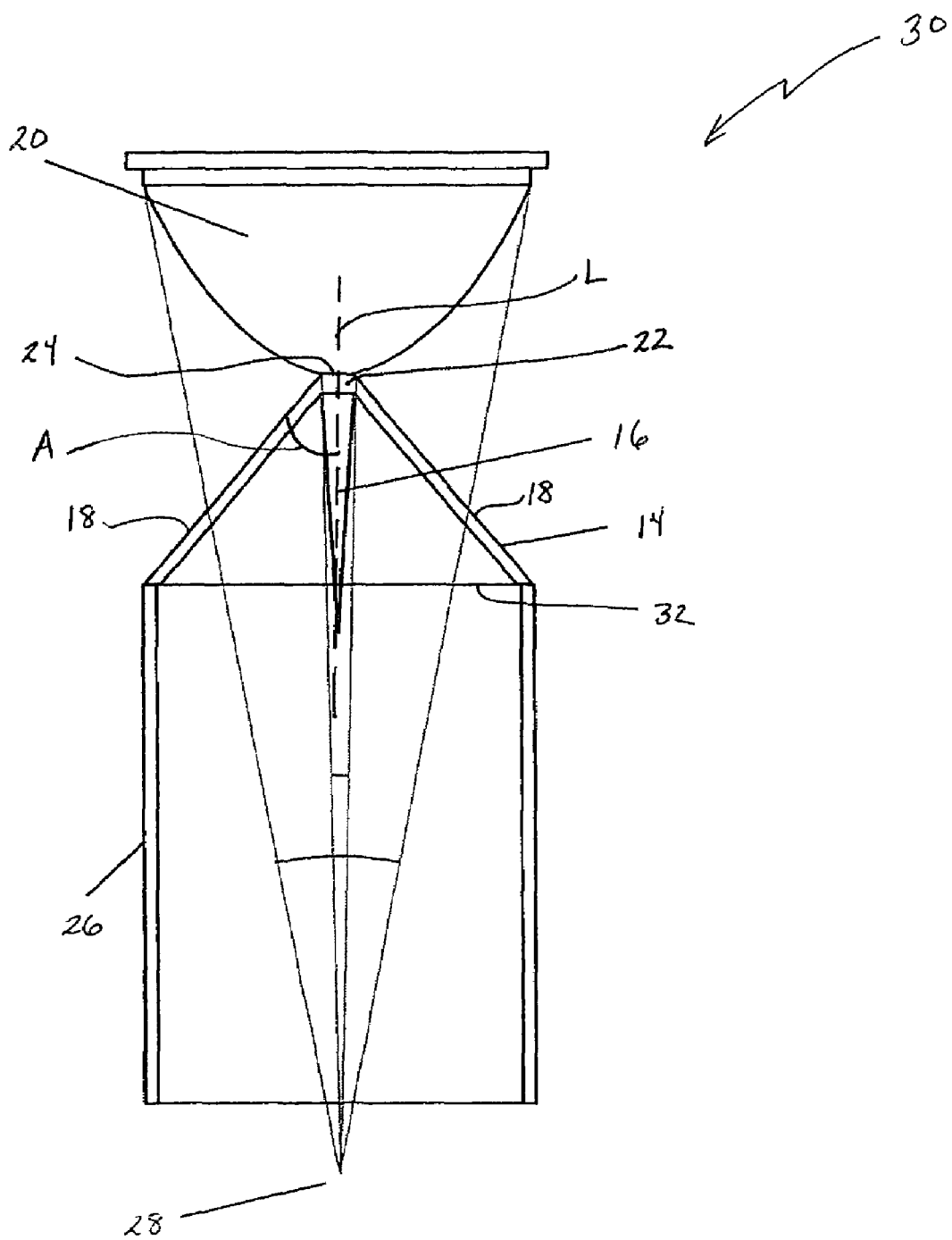
FIG. 2 is a cross sectional view of the mounitng apparatus in accordance with an embodiment of the present invention having a conical optical stage and a masking spike.

The proposed invention solves both the structural and optical problems of the traditional apparatus by replacing the flat optical stage 10 and center post 12, shown in FIG. 1, with a conical optical stage 14 and masking spike 16, shown in FIG. 2. In one embodiment, as shown in FIG. 2, a conical optical stage 14 is constructed to support mirror 20 at the end portion 24 of the mirror such that the mirror is mounted along a longitudinal axis L. The conical optical stage 14 is typically constructed such that an end 22 of the conical stage having a reduced cross-sectional area contacts the end portion 24 of the mirror 20. Any mirror capable of reflecting a panoramic image may be used in conjunction with the mounting apparatus of the present invention. Example mirrors include parabolic, hyperboloidal, equirectangular or equiangular mirrors.

Figure 2A:
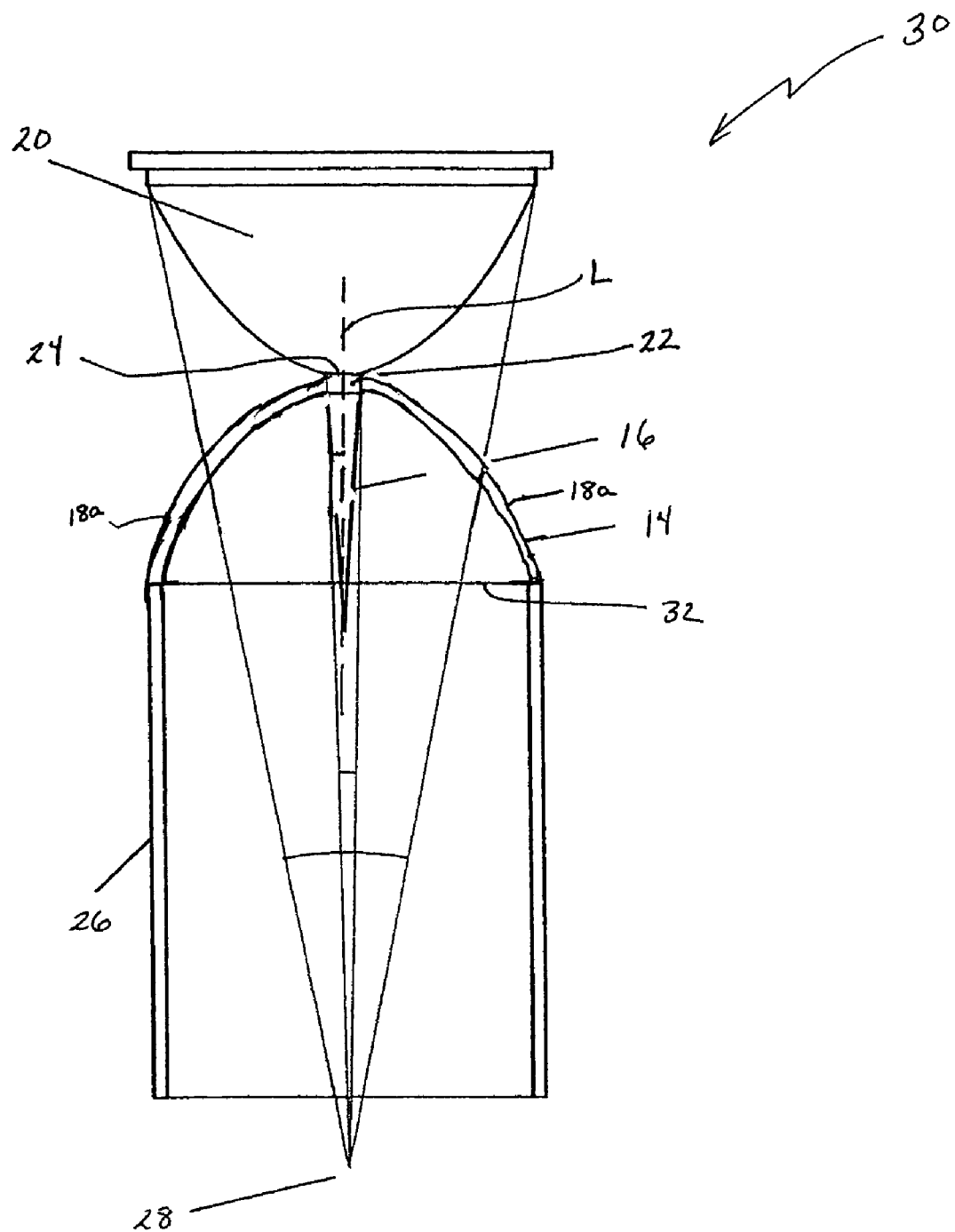
FIG. 2a is a cross sectional view of the mounting apparatus in accordance with an embodiment of the present invention having a convex conical optical stage and a masking spike.
Figure 2B:
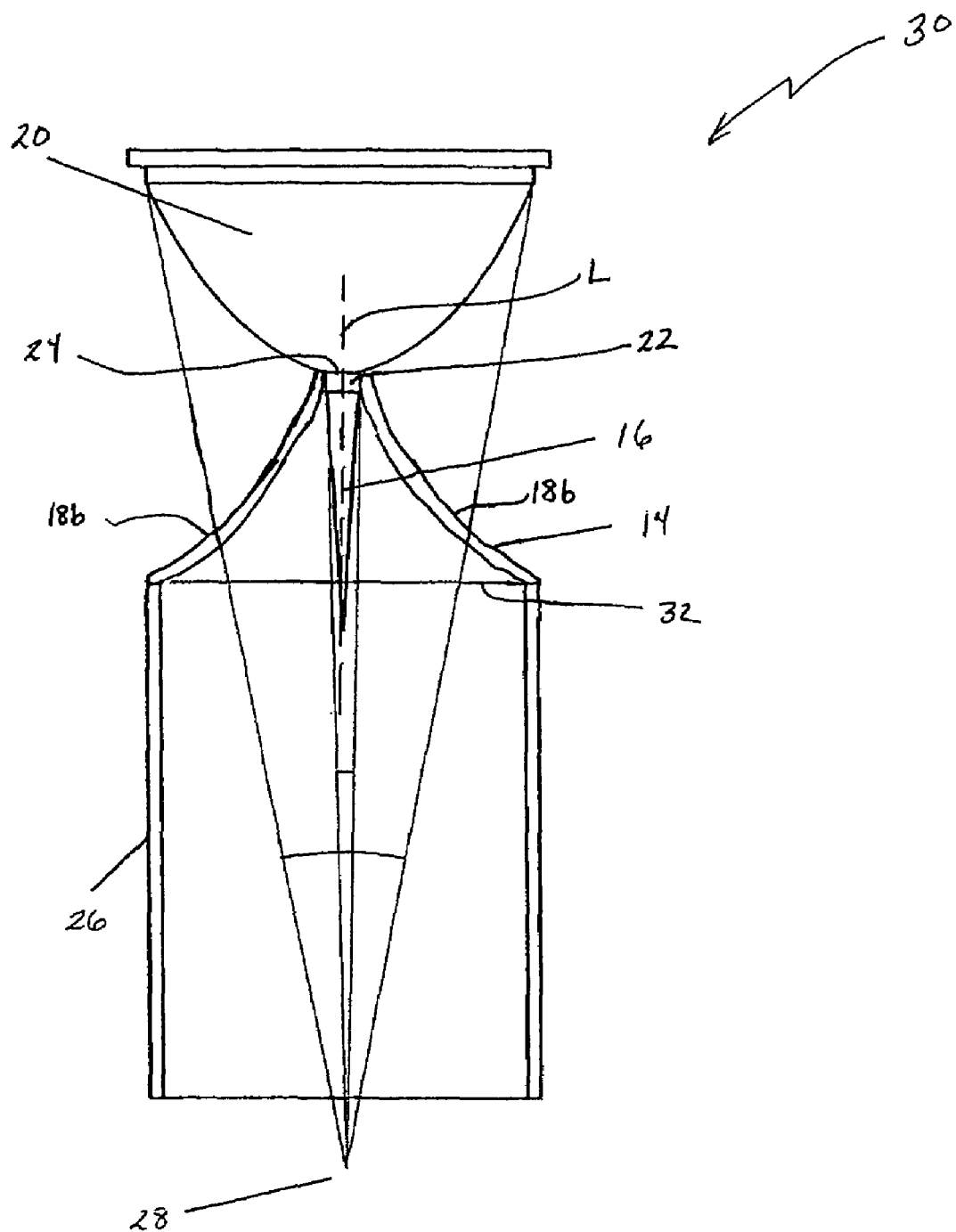
FIG. 2b is a cross sectional view of the mounting apparatus is accordance with an embodiment of the present invention having a concave conical optical stage and a masking spike.

The conical optical stage 14 can be constructed of a clear optical material such as glass or clear plastic. In another embodiment, the conical optical stage has a uniform thickness and straight sides 18 to avoid unwanted distortion in the image reflected by mirror 20. As shown in FIG. 2a, the conical optical stage can have a convex conical shape 18a. As shown in FIG. 2b, the conical optical stage can have a concave conical shape 18b.

The conical optical stage 14 can have any dimensions appropriate to support any size mirror and to accommodate any desired distance between the mirror 20 and the camera focal point 28. Any camera suitable for capturing a panoramic image can be used in conjunction with the mounting apparatus of the present invention. Examples of suitable cameras include video and still cameras, including 35 mm and CCD cameras. Accordingly, angle A, as shown in FIG. 2, can vary according to the size of the mirror and the desired separation distance from the mirror 20 to the camera focal point 28 and optic housing 26. In one embodiment, angle A of the conical optical stage 14 can range from about 20 degrees to about 70 degrees. In another embodiment, angle A can range from about 40 degrees to about 50 degrees. As a particular example, the angle A may be 45 degrees.

In another embodiment, the peak of the conical optical stage 14 can be truncated and flattened to provide a mounting surface for the mirror 20. Mirror 20 may be affixed to the conical optical stage 14 by an adhesive or by a fastening fixture attached to or placed through the mirror 20 and conical optical stage 14.

The improved conical optical stage 14 of the present invention transmits lateral forces applied to the mirror 20 when the mirror 20 is positioned on its side or transported to various locations to the supporting structure of the optic housing 26 without causing the image deformation typically observed with the flat optical stage 10 and center post 12 design as shown in FIG. 1. The conical optical stage 14 can therefore be produced using a thinner and lighter material while still providing better support for the mirror 20 and a more rigid structure for the overall optic 30.

In another embodiment, the conical optical stage 14 can be combined with an optical masking spike 16 to further minimize undesirable reflections into the image reflected by the mirror 20. In some instances, a conical optical stage 14 can be combined with an optical masking spike 16 in order to reduce undesirable reflections reflected from the material of the conical optical stage 14. If the material comprising the conical optical stage 14 is not perfectly transparent, secondary reflections can appear in the reflected image as a result of light glare off the conical optical stage material. By positioning an opaque masking spike 16 along the longitudinal axis L of the conical optical stage 14 such that the masking spike 16 extends at least partially into the interior of the conical optical stage 14, internal secondary reflections are a greatly reduced and the perception of external reflections and glare is further minimized. In one embodiment the masking spike can be substantially opaque and have a low surface reflectivity, such as a matte finish, in order to effectively absorb the secondary reflections. Images captured by a camera using the mounting apparatus of the present invention typically exceed the quality of images produced with a traditional flat optical stage 10.

The optical masking spike 16 can comprise any cylindrical or conical shape, or any extruded profile that does not significantly obscure the image reflected from the mirror 20. In one embodiment of the present invention, the masking spike can be thinner and lighter than the center post of the traditional design since the masking spike does not serve a structural purpose. Unlike a traditional structural center post 12, the thickness of the optical masking spike 16 can be tapered as it approaches the base 32 of the conical optical stage 14 in order to minimize the obstruction of the image.

The optical masking spike 16 can be constructed of any material, including materials that are lightweight and opaque. In one embodiment, the masking spike 16 comprises a light absorbing material such as Delrin™ commercially available from du Pont de Nemours and Company, other hard opaque plastics, finished composite materials, or metals such as aluminum. In another embodiment, the masking spike may be black or another dark color to further absorb reflected glare.

Since the material of the conical optical stage 14 inevitably has a higher index of refraction than air, incident light from the mirror 20 will be directed toward the center of the captured image. For conical optical stages having straight side walls of a uniform thickness, this distortion is linear in the radial direction. For optical stages having convex or concave conical shapes, another distortion will be present in the radial direction only. Since images produced through traditional panoramic optics are typically post-processed using a software algorithm, the distortion is easily countered. A calibration process may be used to determine the appropriate correction for any observed distortion. The process involves photographing a known target, such as a ruler with marks indicating every 5 degrees off the horizon, and measuring the displacement in the image as compared to known measurements. An inverse function can be computed from this measurement and applied to the software algorithm.

Unlike traditional mounting apparatus systems in which the distortion must be countered by removing unusable pixels, the distortion produced using an apparatus 30 having a conical optical stage 14 and an optical masking spike 16 benefits the image because the traditionally unusable center pixels of the image now contain useable image data, increasing the potential vertical resolution of the resulting panoramic image. As used herein, the term "vertical resolution" of the image means the number of pixels along a radius over a specific angular range, e.g. pixels per degree of latitude. Examples of suitable software algorithms include methods for processing photographic images involving the steps of retrieving a source image file including pixel data, mapping the source image file pixel data into at least one representation of one or more dormant properties of the viewable image, and displaying cooperatively the at least one viewable image and the at least one representation of the one or more dormant properties of the viewable image are disclosed in U.S. patent application Ser. No. 10/289,701 filed Nov. 7, 2002 and U.S. patent application Ser. No. 10/256,743 filed Sep. 26, 2002 which are herein incorporated by reference.

Figure 3:
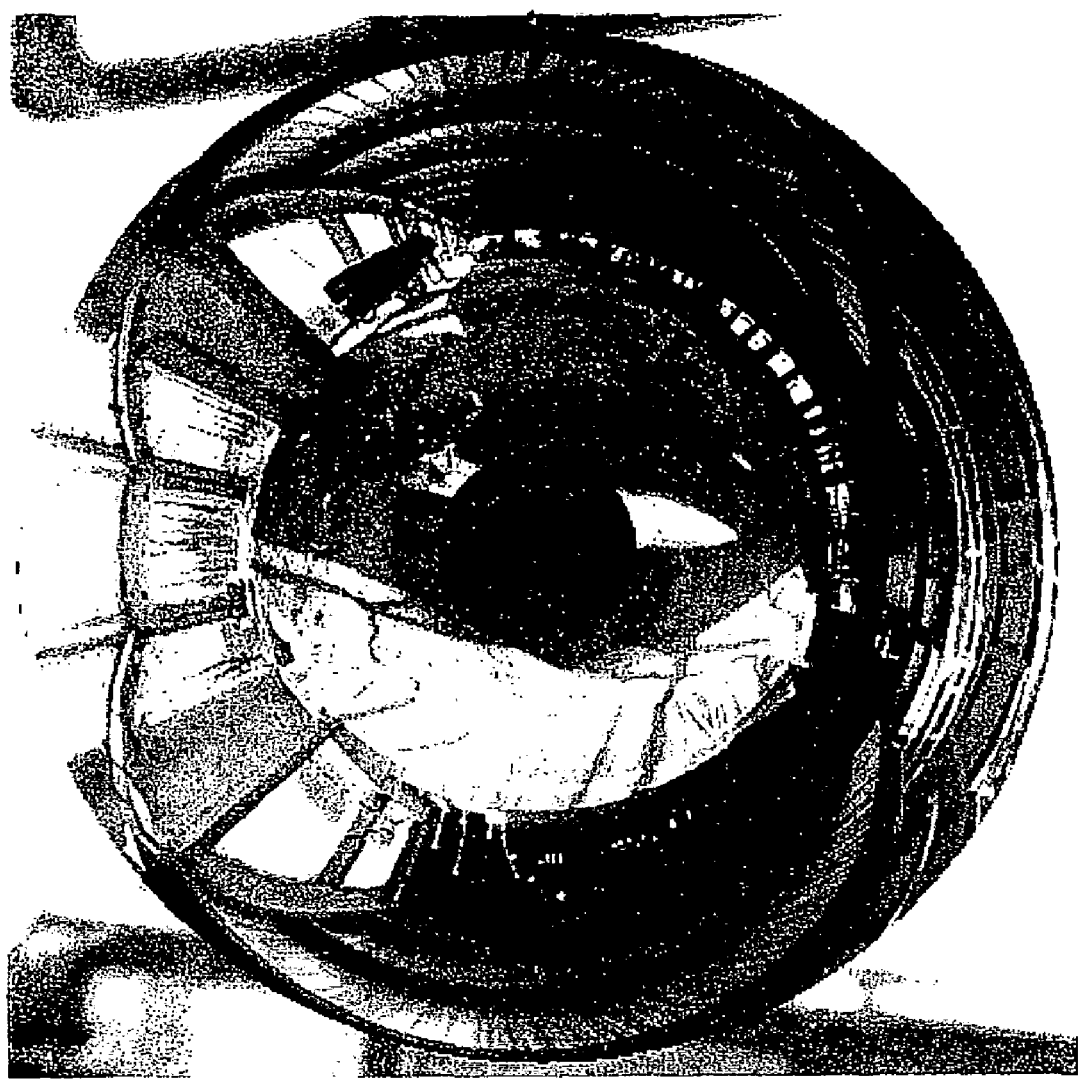
FIG. 3 is a simulated graphical representation that illustrates the photograph quality taken with a traditional apparatus using an equirectangular mirror supported by a center post and flat optical stage.
Figure 4:
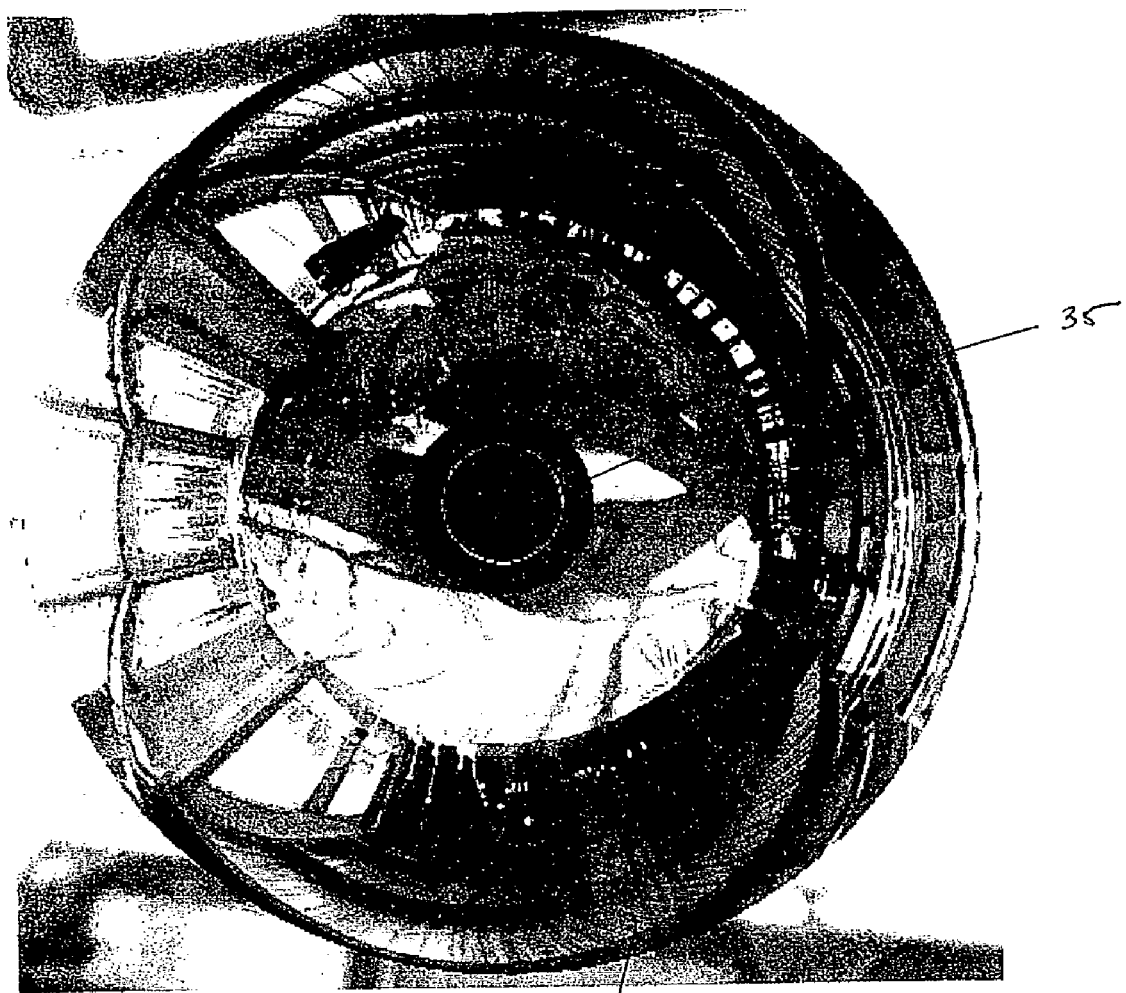
FIG. 4 is a simulated graphical representation that illustrates the photograph quality taken with the same equirectangular mirror supported by a conical optical stage without a masking spike.
Figure 5:
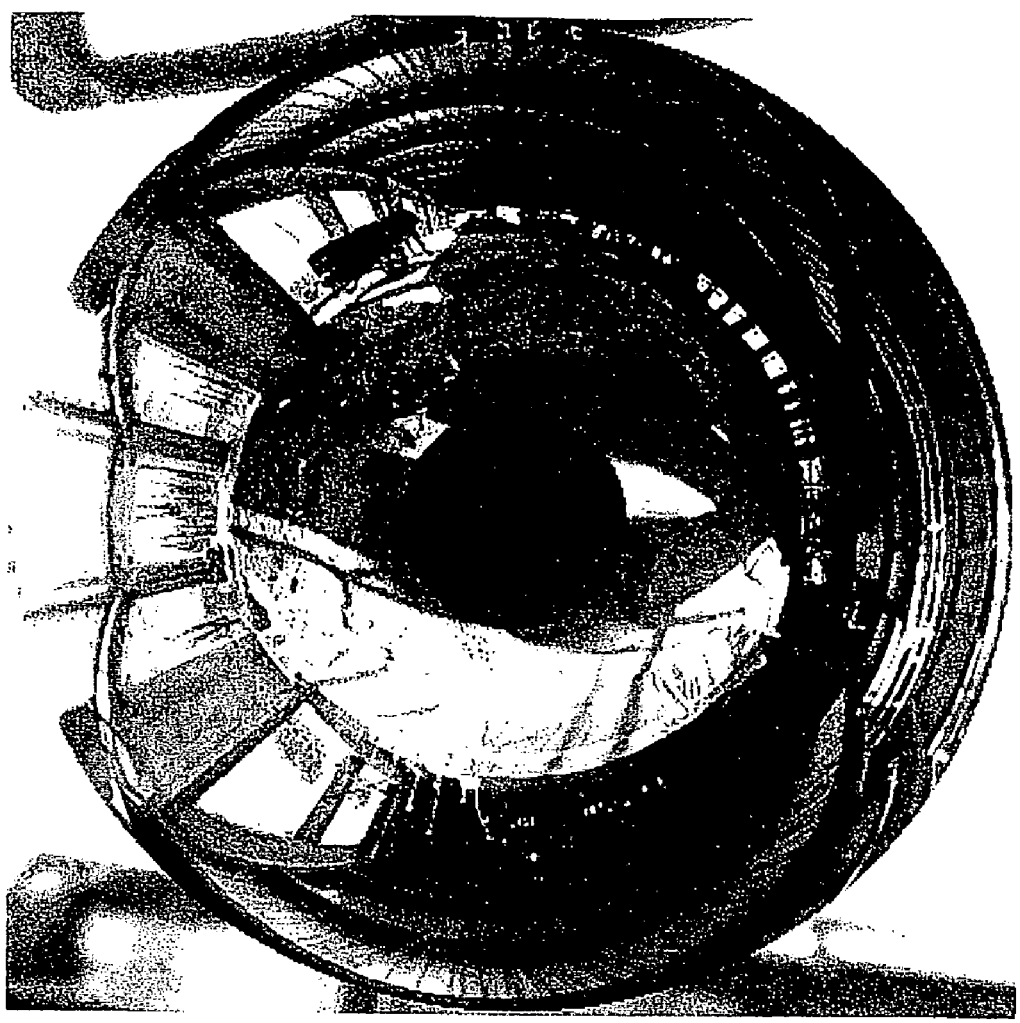
FIG. 5 is a simulated graphical representation that illustrates the photograph quality taken with the same equirectangular mirror supported by a conical optical stage and including a masking spike.

FIGS. 3-5 are simulated photographic representations, each of which depict the same scene, as if each photograph were taken with a different apparatus. A true panoramic photograph was produced using the traditional apparatus, as shown in FIG. 1, including an equirectangular mirror 20, center post 12 and a flat glass optical stage 10. The resulting panoramic image was then processed using a computer algorithm to display the image as textured on the inside of a virtual cylinder, and a conventional ray tracing application was used to produce simulated photographs of the same virtual scene from each apparatus for purposes of comparison FIG. 3 is a simulated photograph generated using the conditions of an equirectangular mirror 20 supported by a flat optical stage 10 and a center post 12. FIG. 4 is a simulated photograph generated using the conditions of the same equirectangular mirror 20 supported by a conical optical stage 14 without a masking spike. As seen in FIG. 4, undesirable reflections resulting from this arrangement introduce "ghost images" 35 or glare on the image. FIG. 5 is a simulated photograph generated using the conditions of the same equirectangular mirror 20 supported by the same conical optical stage 14 including a masking spike 16. Due to the presence of the masking spike 16, the unwanted "ghost images" 35 have been obstructed from the resulting image.

Figure 6:
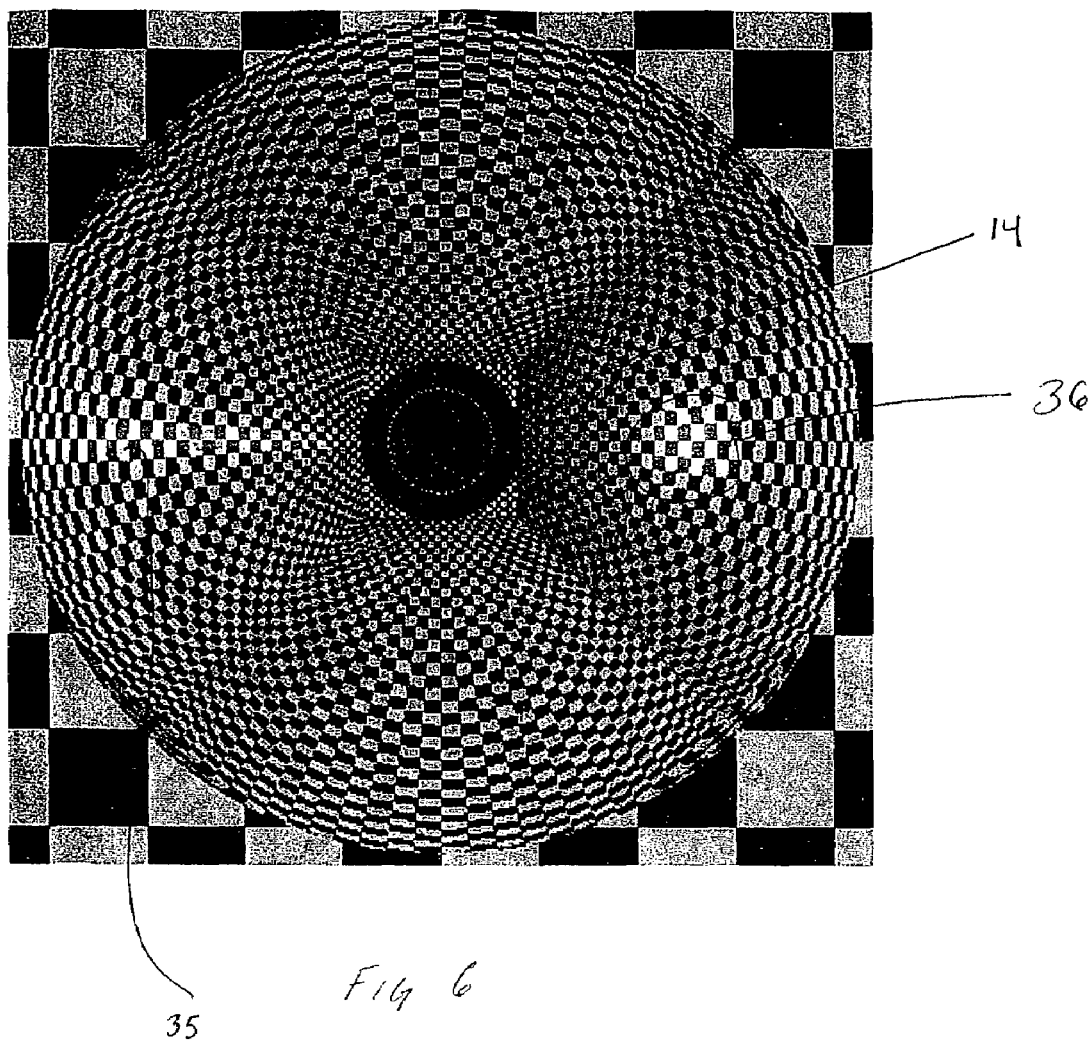
FIG. 6 is a simulated graphical representation of a virtual box having a black and white checkerboard pattern and a simulated bright light source located to the right of the apparatus that illustrates the photograph quality taken with an equirectangular mirror supported by a conical optical stage without a masking spike.
Figure 7:
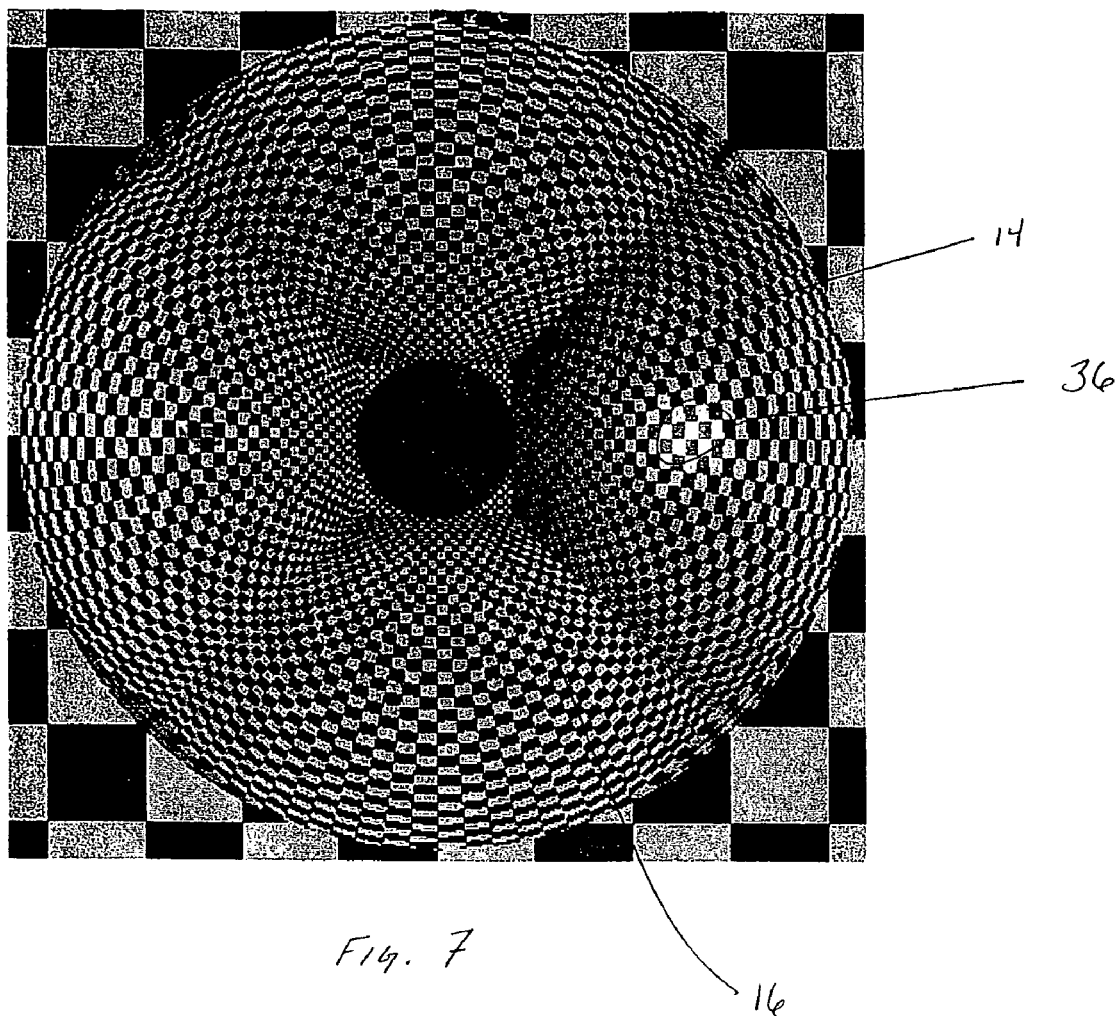
FIG. 7 is a simulated graphical representation of a virtual box having a black and white checkerboard pattern and a simulated bright light source located to the right of the apparatus that illustrates the photograph quality taken with the same equirectangular mirror supported by a conical optical stage and including a masking spike.

FIGS. 6-7 were also generated using a computer algorithm to depict simulated photographs of a virtual box having a black and white checkerboard pattern. A bright light source 36 is simulated to the right of the apparatus, in line with the tip of the conical optical stage 14. FIG. 6 is a simulated photograph generated using the conditions of an equirectangular mirror 20 supported by a conical optical stage 14 without a masking spike. A "ghost image" 35 of the checkerboard pattern and the column of light shining on the box is produced as the simulated light source is refracted through the conical stage 14. FIG. 7 is a simulated photograph generated using the conditions of the same equirectangular mirror 20 supported by a conical optical stage 14 and including a masking spike 16. As shown in FIG. 7, the presence of the masking spike 16 obscures the "ghost image" 35 and the projection of light is no longer refracted into the image.

Figure 8:
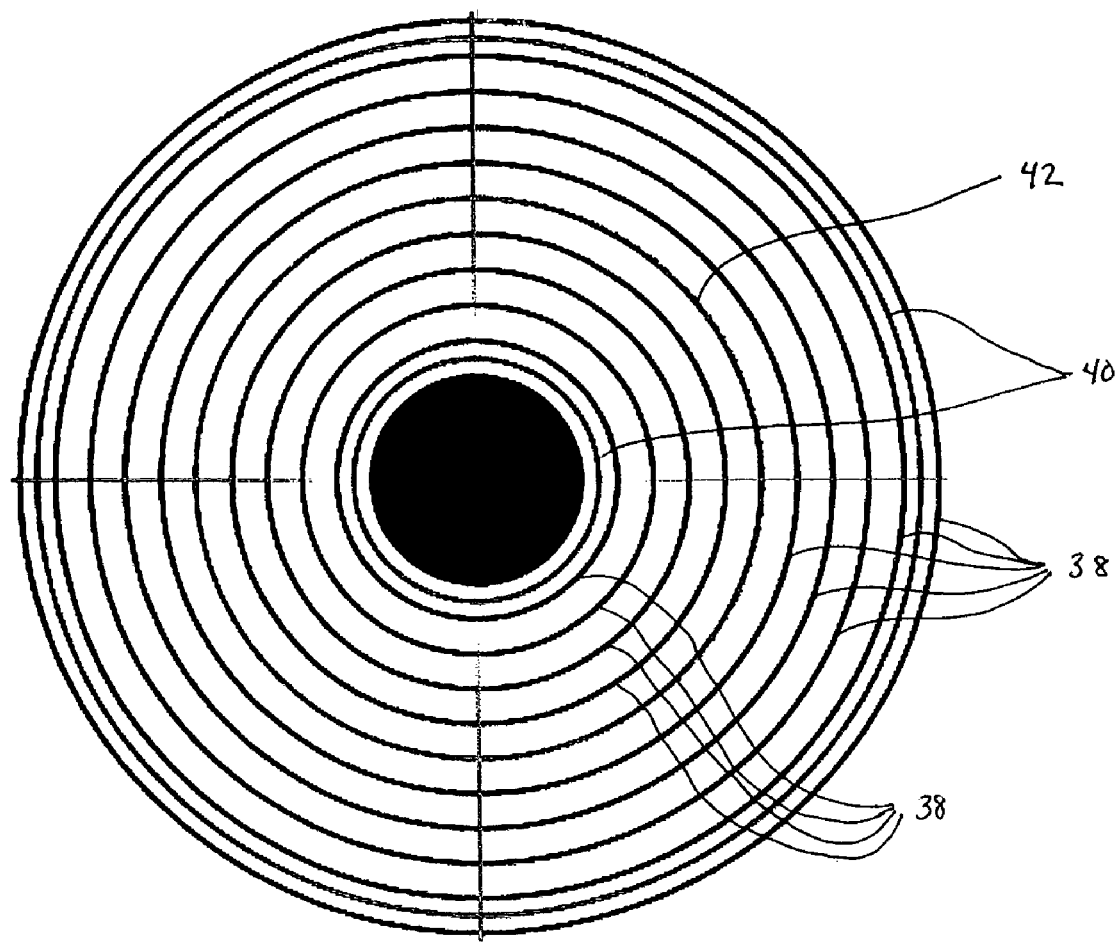
FIG. 8 is simulated graphical representation of a graduated cylinder having lines placed at various increments of inclination that illustrates the photograph quality taken with a traditional apparatus using an equirectangular mirror supported by a center post and flat optical stage.
Figure 9:
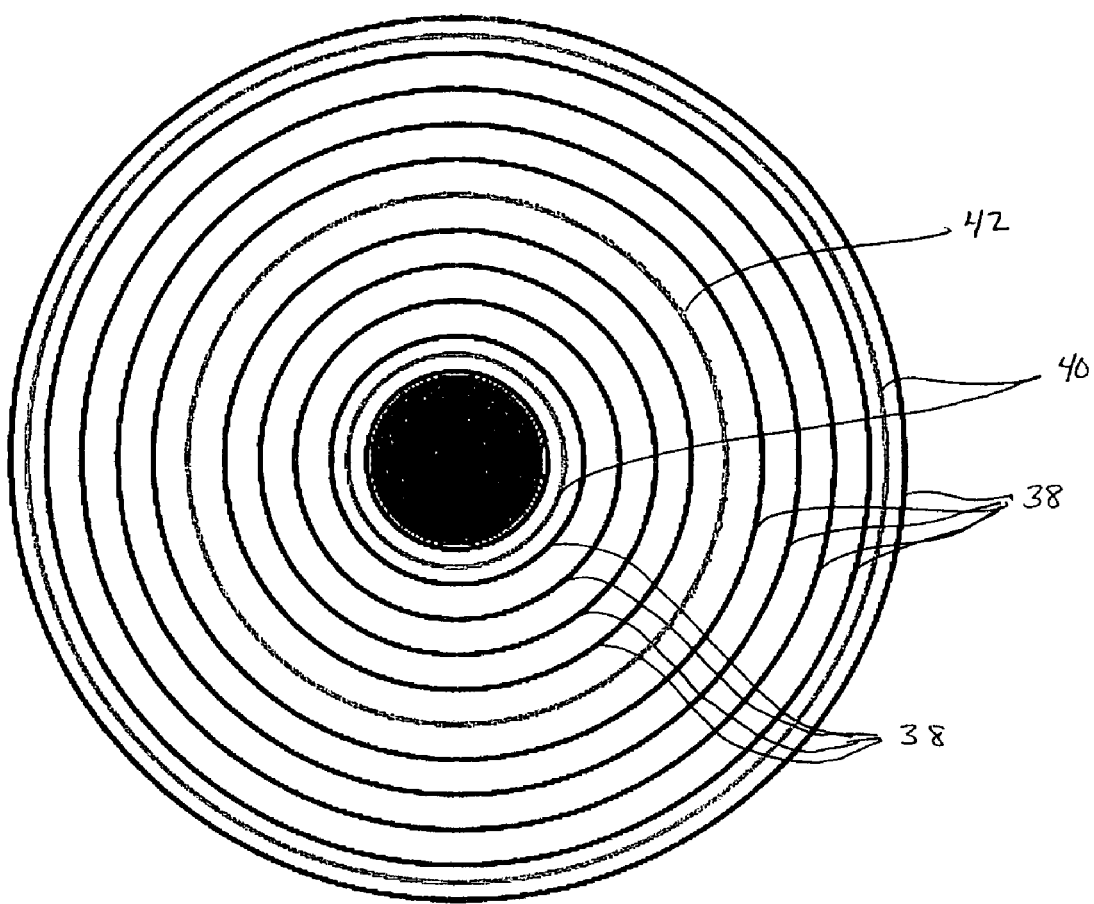
FIG. 9 is a simulated graphical representation of a graduated cylinder having lines placed at various increments of inclination that illustrates the photograph quality taken with the same equirectangular mirror supported by a conical optical stage and including a masking spike.

FIGS. 8-9 were also generated using a computer algorithm to depict simulated photographs of a graduated cylinder, having lines 38 placed at 10 degree increments of inclination, a line 42 at the horizon having 0 degrees inclination, and lines 40 at +/−45 degrees of inclination. FIG. 8 is a simulated photograph generated using the conditions of an equirectangular mirror 20 supported by a center post 12 and flat optical stage 10. FIG. 9 is a simulated photograph generated using the conditions of the same equirectangular mirror 20 supported by a conical optical stage 14 and including a masking spike 16. The refraction of the image through the conical optical stage results in a uniform radial distortion as compared to the reflection of the ghost image 35 through the traditional apparatus. As shown in FIG. 9, projected radial lines toward the center of the image are pulled inwards by a fixed proportion. This proportion is dependent upon the refractive index of the conical optical stage material and the thickness of the stage itself.

The performance of the apparatus from mounting a panoramic mirror as shown in FIG. 2 demonstrates the practical utility of utilizing a conical optical stage 14 and an optical masking spike 16 as a replacement for the normal flat optical stage 10 and center post 12 while still maintaining or exceeding the performance capabilities of previous mounting designs.

Whereas particular embodiments of this invention have been described above for purposes of illustration, it will be evident to those skilled in the art that numerous variations of the details of the present invention may be made without departing from the invention.

What is claimed is:

1. An apparatus for mounting a panoramic mirror having an outer mirror diameter, comprising a generally conical optical stage including a substantially clear material and having a first end having a first stage diameter structured to be fastened to a panoramic mirror and a second end having a second stage diameter, wherein the second diameter is greater than the first diameter, the first diameter is less than the outer mirror diameter and a reflected image from the panoramic mirror passes through the substantially clear material of the optical stage.

2. The apparatus of claim 1, wherein the optical stage has a convex conical shape.

3. The apparatus of claim 1, wherein the optical stage has a concave conical shape.

4. The apparatus of claim 1, wherein the optical stage comprises a substantially transparent material.

5. The apparatus of claim 1, wherein the optical stage comprises at least one side extending between the first end and the second end, the side forming an angle with the longitudinal axis of the optical stage of from 20 degrees to 70 degrees.

6. The apparatus of claim 5, wherein the angle is from 40 degrees to 50 degrees.

7. The apparatus of claim 1, wherein the first end is truncated.

8. The apparatus of claim 1, further comprising an optical masking spike disposed along a longitudinal axis of the optical stage and extending from the first end of the optical stage at least partially into an interior of the optical stage.

9. The apparatus of claim 8, wherein the masking spike extends from the first end of the optical stage to the second end of the optical stage.

10. The apparatus of claim 8, wherein the masking spike extends from the first end of the optical stage along the longitudinal axis to an area beyond the second end of the optical stage.

11. The apparatus of claim 8, wherein the masking spike comprises a first end having a first diameter disposed adjacent the first end of the conical optical stage and a second end having a second diameter, wherein the second diameter is less than the first diameter.

12. The apparatus of claim 8, wherein the masking spike comprises a light absorbing material.

13. The apparatus of claim 1, wherein the first end of the optical stage is fastened to an end portion of the mirror along a longitudinal axis of the mirror.

* * * * *